United States Patent [19]

Kanai et al.

[11] 4,385,312

[45] May 24, 1983

[54] SINGLE IMAGE PICKUP TUBE TYPE COLOR TELEVISION CAMERA SYSTEM

[75] Inventors: Hisashi Kanai, Kawasaki; Harukichi Nagai, Yokohama, both of Japan

[73] Assignee: Tokyo Shibaura Denki Kabushiki Kaisha, Japan

[21] Appl. No.: 246,177

[22] Filed: Mar. 23, 1981

[30] Foreign Application Priority Data

| | | | |
|---|---|---|---|
| Mar. 24, 1980 | [JP] | Japan | 55-38500[U] |
| Mar. 24, 1980 | [JP] | Japan | 55-38501[U] |
| Mar. 24, 1980 | [JP] | Japan | 55-38502[U] |
| Mar. 24, 1980 | [JP] | Japan | 55-38503[U] |

[51] Int. Cl.$^3$ .............................................. H04N 9/07

[52] U.S. Cl. .............................................. 358/44; 358/163

[58] Field of Search .................... 358/44, 41, 163, 229

[56] References Cited

U.S. PATENT DOCUMENTS 3,291,091 12/1966 Takagi et al. .

4,218,712 8/1980 Clymer ................................ 358/229

*Primary Examiner*—Richard Murray

*Attorney, Agent, or Firm*—Finnegan, Henderson, Farabow, Garrett & Dunner

[57] ABSTRACT

In a single image pickup tube color television camera, color shading is corrected by providing a magnetic material selectively disposed adjacent a magnetic field electron beam alignment means disposed adjacent said image pickup tube in the vicinity of the tube control electrode.

8 Claims, 6 Drawing Figures

SINGLE IMAGE PICKUP TUBE TYPE COLOR TELEVISION CAMERA SYSTEM

BACKGROUND OF THE INVENTION

This invention relates to a single image pickup tube type color television camera, and is more particularly concerned with an improved color television camera using an electrostatic focusing and electromagnetic deflection type image pickup tube.

In a compact color television camera using a single image pickup tube, color television signals are obtained by scanning an electron beam on the tube target including a plurality or optical stripe filters mounted thereon.

The optical filters have different stripe pitches from one another in order to generate different carrier frequencies during beam scanning corresponding to the respective pitches.

In a recently developed system of this type a ⅔ inch Vidicon tube is equipped with electrostatic focusing and electromagnetic deflection and achieves low power comsumption with compact size. In this newly developed compact image pickup tube, the cross section of the electron beam is much smallers than in the conventional electromagnetic focusing and deflection type image pickup tube. As a result, high accuracy of beam alignment is required to avoid the color shading defect in this color camera system. The advantages of reduced size and power consumption are only obtained with increased problems due to color shading. Color shading is the non-uniformity in color of the image which reduces the quality of the image.

In this type of color television camera system, signal modulation uniformity is a most important characteristic but is very difficult to obtain with each camera manufactured. In the manufacturing process, each camera will be structurally slightly different thereby effecting beam alignment, beam intensity and coma effect.

Thus in seeking to achieve a more compact and lower power consuming camera system, the following specific problems must be solved or eliminated to obviate the adverse effects of color shading. First, because of the smaller size of the tube, errors are introduced during scanning because of coma effects. Secondly, variations from tube to tube introduced during manufacture can result in misdirection of the electron beam within the tube. Finally, also because of imperfections introduced during manufacture, the energy density distrubution of the electron beam will vary from tube to tube. Each of these factors effects color shading because each causes non-uniform output signal modulation characteristics.

Electron beam alignment is usually achieved by using the weak magnetic field from the beam alignment coil or the like which is disposed on the tube in the vicinity of the beam control grid or Gl electrode gun of the pickup tube.

However, it is impossible to avoid such color shading defect completely only by adjusting the alignment coil or the like because is it very difficult to obtain the uniform signal output modulation from all over the beam scanning area due to coma error of the electron beam. There are also some inaccuracies of the electrodes because of assembling and winding distribution errors in the alignment coils and deflection coils.

Consequently, in the new ⅔ inch electrostatic focusing and electromagnetic deflection type tube, it becomes much harder to correct the color shading in each pickup tube than it was to correct for the conventional 1 inch electromagnetic focusing and deflection type tube.

It is therefore an object of this invention to provide an improved single pickup tube type color television camera system.

It is a further object of this invention to provide an improved single pickup tube type color television camera system using electrostatic focusing and electromagnetic deflection type tube.

It is a still further object of the invention to provide such an improved color television system which corrects for color shading.

These and other objects are accomplishedd in accordance with this invention by providing magnetic color shading correction means in the vicinity of the beam alignment means which is disposed near the beam control grid or Gl electrode of the electron gun means of the tube.

BRIEF DESCRIPTIONS OF THE DRAWINGS

DESCRIPTION OF THE PREFERRED EMBODIMENTS

Figure 1:
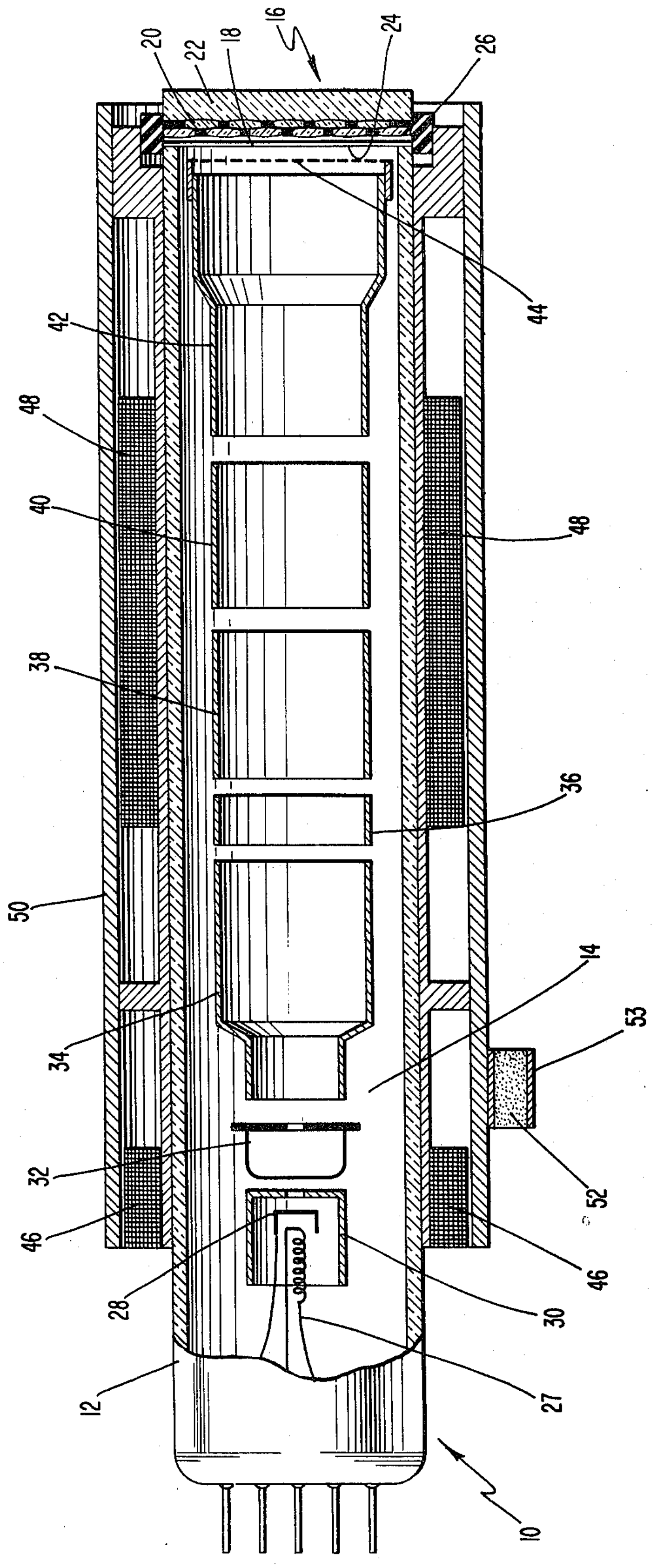
FIG. 1 is a cross-sectional view of one embodiment of a single image pickup tube type color television camera system in accordance with this invention.

Referring to FIG. 1 of the drawing, there is shown one embodiment of a single image pickup tube color television camera system using a photoconductive image pickup tube 10 of the electrostatic focusing type which could for instance be of the newly developed ⅔ inch type.

Tube 10 comprises an elongated, evacuated envelope 12 having an electron gun means 14 in one end thereof, and positioned substantially on the tube axis. The electron gun means 14 is for the purpose of producing an electron beam and directing the beam towards a target electrode 16.

The target electrode 16 comprises a transparent electrical conductor 18 and optical filters 20 supported on a transparent faceplate 22 of the envelope 12.

On the transparent electrical conductor 18, there is provided a photoconductive member 24. The transparent conductor 18 is electrically connected to a sealing ring 26. A potential applied by the sealing ring to the conductor 18 during tube operation will cause the conductor to function as an output electrode.

The electron gun means 14 includes a heater 27, a cathode 28, a beam control grid or electrode 30, an apertured accelerating electrode or G2 electrode 32 and a plurality of focusing electrodes or G3–G7 electrodes 34–42. The tubular G7 electrode 42 is connected to a fine mesh electrode or G8 electrode 44.

The G3, G5, and G8 electrodes 34, 38, and 44 are electrically connected to the same potential, for example, about 1600 volts. The G2 and G4 electrodes 32 and 36 are connected to the same potential, for example, about 350 volts.

The G6 and G7 electrodes 40 and 42 are connected to different potentials, for example, 300 volts and about 800 volts, respectively.

Around the tube 10, a beam alignment coil 46 and a deflection coil 48 are mounted a prescribed distance apart from each other. These coil assemblies are housed in a cylindrical case 50.

Further, a magnetic color shading correction means 52 is attached on the exterior surface of case 50 in the vicinity of the beam alignment coil 46.

According to this embodiment, the permanent magnetic member 52 is adhesively attached in the area between the alignment coil 46 and the deflection coil 48. The magnetic member 52 is, for example, comprised of a rubber magnet material and has slightly higher magnetic field intensity than that of the alignment coil 46. The magnet 52 is covered, in thisembodiment, by a non-melting material 53.

In one example, a square rubber magnet 52 of about 5 millimeter length is attached on the case 50 in an area which is about 3–5 centimeters from a plane vertically extended from the cathode face and its magnetic field intensity is about 300 gausses.

With the above-mentioned structure, the color shading correction is achieved by moving the magnetic member 52 while monitoring the color shading conditions. The field intensity of magnetic member 52 affects some portions of the magnetic field created by the beam alignment coil 46. The best position will vary for each individual tube because of differences in the structure resulting from manufacturing. Once the best position has been found, i.e. color shading is minimized, the magnetic member 52 is adhesively fixed at that position.

Only one magnetic member 52 is shown in this embodiment, but it is, of course, possible to attach a plurality of such magnetic members to better resolve the color shading condition. Further, the polarity and the magnetic field intensity of the magnetic member 52 can be changed in accordance with the color shading condition.

Figure 2:
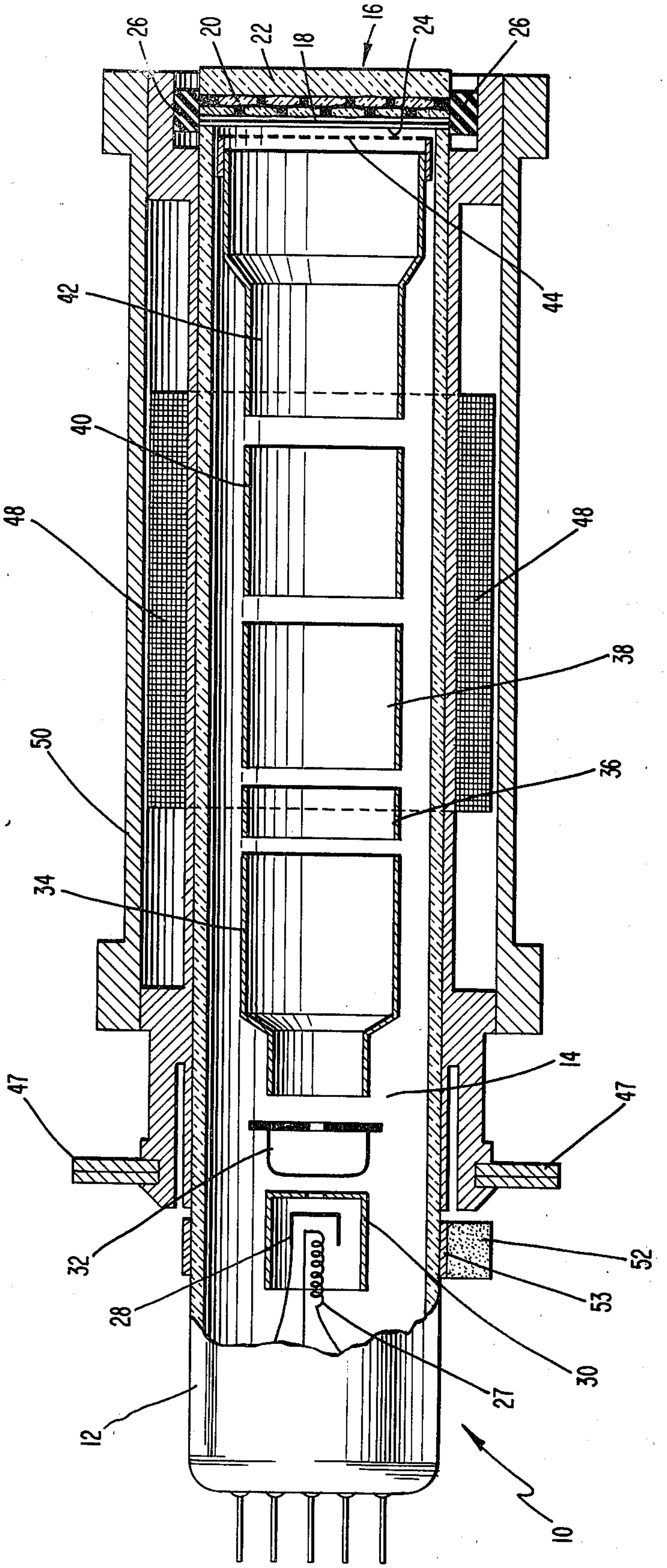
FIG. 2 is a cross-sectional view of another embodiment in accordance with this invention.

Referring to FIG. 2, there is shown another embodiment of a single image pickup tube color television camera system using a newly developed ⅔ inch photoconductive image pickup tube 10 of the electrostatic focusing type.

The structure of the pickup tube 10 is the same as shown in FIG. 1 and therefore the same numbers are used to show the same parts of the tube shown in FIG. 1.

In this embodiment, a deflection coil 48 and beam alignment magnetic rings 47 are mounted on the tube casing member 50 at some prescribed distance apart from each other. A magnetic color shading correction means 52 is directly attached on the tube 10 by a supporting band 53 in the vicinity of the beam alignment magnetic rings 47.

According to this embodiment, the permanent magnet 52 is attached on the supporting band member 53 mounted on tube 10 which can easily move along the tube surface to the best position to make the color shading correction. The magnet member 52 can be moved back and forth along the tube 10 and also can rotate around the tuve surface in the vicinity of the control electrode of the electron gun.

Figure 3A:
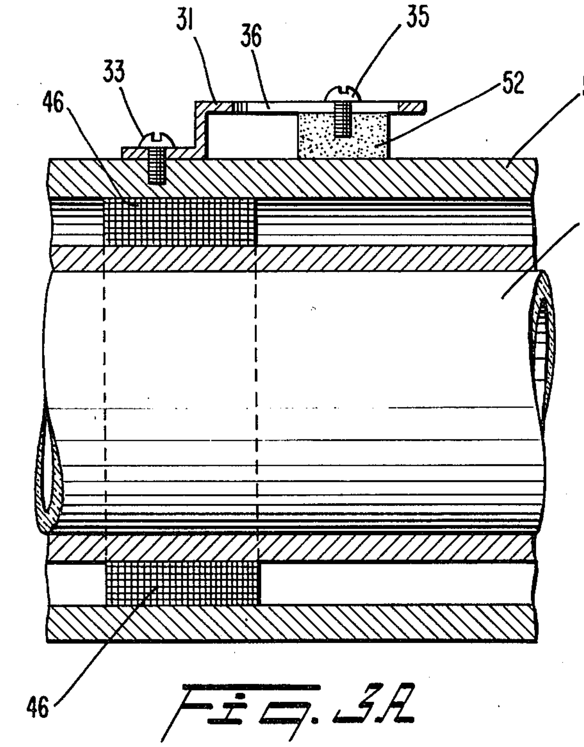
FIGS. 3A and 4A are partially cut off cross-sectional views of another embodiment of a color shading correction means.
Figure 3B:
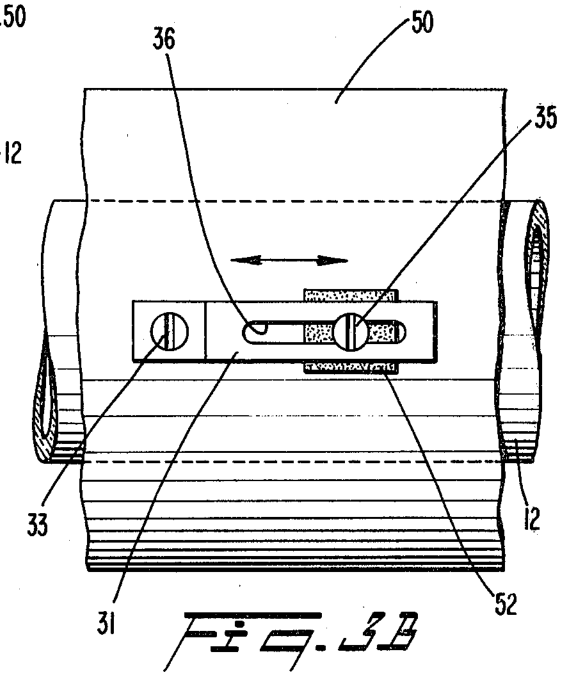
FIGS. 3B and 4B are plain views of FIGS. 3A and 4A, respectively.

FIGS. 3A and 3B show another embodiment of the color shading correction means. FIG. 3A shows a partially cut-off cross-sectional view of the color shading correction means. In this embodiment, a magnetic member 52 is attached on the tube casing member 50 with a L-shaped support member 31. As shown in FIG. 3B which shows a plan view of FIG. 3A, the support member 31 including a slit apertured guide portion 36 attached at its one end portion on the tube case 50 by a screw member 33. The magnetic member 52 is slidably attached in the guide portion 36 by a screw member 35. According to this structure, the magnetic member 52 can rotate along the support screw member 33 and also can slidably move in the split apertured guide 36 in order to find the best position for color shading correction. Once the best position is located, the magnetic member 52 is firmly fixed by both screw member 33 and 35 at that position.

Figure 4A:
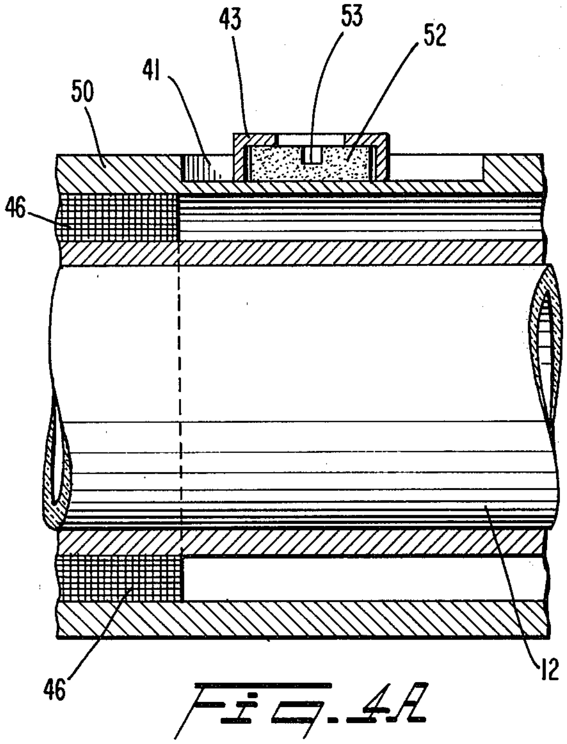
Figure 4B:
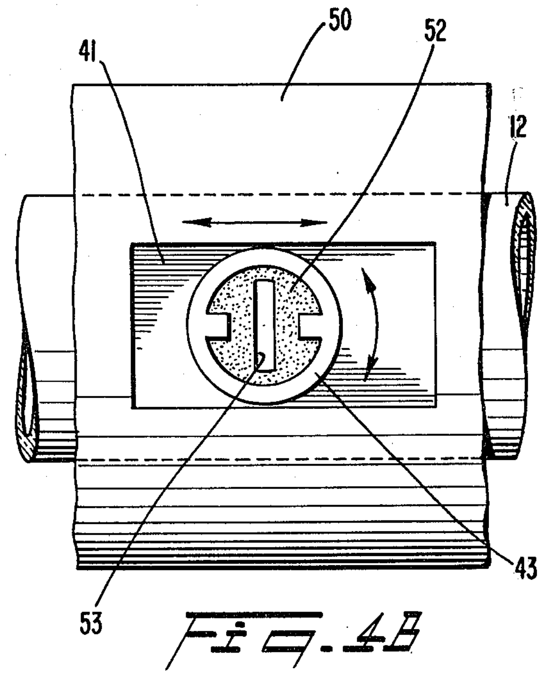

FIGS. 4A and 4B show another embodiment of the invention. In FIG. 4A, a magnetic member 52 is rotatably disposed in a rectangular shaped groove portion 41 of tube case 59 in the vicinity of beam alignment coil 46. A supporting member 43 being formed by a resin material is inserted into the groove portion 41. A small circular cylindrically shaped permanent magnet 52 is also inserted into the supporting member 43.

On the surface of the magnet 52, a small groove 53 is provided in which a screwdriver or the like can be inserted in order to move the magnet along the casing groove 41 and also to rotate it as indicated by arrows in FIG. 4B in order to find the best position for color shading correction while monitoring the color shading condition. According to this embodiment, since both the magnet member and the supporting member are inserted into the casing groove, the magnet position is not so affected by vibration or the like.

As explained above, according to this invention, a color shading correction of a color television camera using a small vidicon type image pickup tube can achieve by the simple operation.

What is claimed is:

1. A single image pickup tube type color television camera system comprising:

an electrostatic focusing and electromagnetic deflection type image pickup tube including an electron beam control electrode and a plurality of focusing electrodes;

electron beam alignment means for producing a magnetic field disposed adjacent said image pickup tube in the vicinity of said control electrode;

deflection means disposed adjacent said tube and apart from said alignment means along the longitudinal axis of said tube;

means for correcting color shading comprised of a magnetic material selectively disposed adjacent said tube in the vicinity of said beam alignment means; and said means for correcting color shading having a magnetic field intensity to effect some portion of the magnetic field of said beam alignment means thereby reducing color shading effects.

2. A single pickup type color television camera system in accordance with claim 1 wherein said means for correcting color shading is disposed in the vicinity of the beam alignment coil on said tube.

3. A color television camera system in accordance with claim 1 wherein said electron beam alignment means is magnetic rings mounted on said tube.

4. A color television camera system in accordance with claim 3 wherein said means for correcting color shading is disposed on the side to said magnetic rings opposite the target electrode of said tube.

5. A color television camera system in accordance with claim 1 wherein said means for correcting color shading is disposed between said alignment coil and said deflection means.

6. A color television camera system in accordance with claim 1 wherein said means for correcting color shading is comprised of a permanent magnetic member and a support member including a slidable guide portion attached on the tube for selectively positioning said magnetic member.

7. A color television camera system in accordance with claim 1 wherein said tube has a longitudinal groove in its exterior wall in the vicinity of the beam alignment means and said means for correcting color shading is comprised of magnetic member with a support member inserted into and movable in said groove.

8. A color television camera system in accordance with claim 7 wherein said magnetic member is cylindrically shaped and adaptedd to be rotated in said groove and moved longitudinally in said groove.

* * * * *